United States Patent [19]

Suganuma et al.

[11] Patent Number: 4,518,563
[45] Date of Patent: May 21, 1985

[54] METHOD FOR MANUFACTURING A SLIDE MEMBER

[75] Inventors: Tetsuya Suganuma, Nagoya; Koji Kazuoka, Toyota, both of Japan

[73] Assignee: Toyota Jidosha Kabushiki Kaisha, Toyota, Japan

[21] Appl. No.: 610,945

[22] Filed: May 17, 1984

Related U.S. Application Data

[63] Continuation of Ser. No. 393,651, Jun. 30, 1982, abandoned.

[30] Foreign Application Priority Data

Jul. 1, 1981 [JP] Japan .................. 56-102445

[51] Int. Cl.³ .............................. B22F 1/00
[52] U.S. Cl. ........................ 419/29; 75/243; 419/26; 419/38
[58] Field of Search ............ 75/243; 419/26, 29, 419/38

[56] References Cited

U.S. PATENT DOCUMENTS 4,035,200 12/1977 Valentijn .............. 427/255.4 X
4,388,114 6/1983 Suganuma ................... 75/243

Primary Examiner—Leland A. Sebastian
Attorney, Agent, or Firm—Oblon, Fisher, Spivak, McClelland & Maier

[57] ABSTRACT

A method for manufacturing a slide member by molding an alloy powder composed of, by weight, from 2.5 to 7.5% of Cr, from 0.1 to 3.0% of Mn, from 0.2 to 0.8% of P, from 1.0 to 5.0% of Cu, from 0.5 to 2.0% of Si, from 0 to 3% of Mo, from 1.5 to 3.5% of C, and the balance being Fe with less than 2.0% of impurities into a compressed powder mass under a molding product pressure of 5 to 7 ton/cm²; sintering the compressed powder mass at a temperature of 1020° to 1180° C. to produce a sintered alloy mass; treating the sintered alloy mass for 0.5 to 3 hours by soaking the sintered alloy mass at a temperature from 450° to 550° C. under a reduced pressure of 0.1 to 0.8 atm. while exposing the sintered alloy mass to a gas, the gas having a main component selected from the group consisting of a non-oxidizing type gas and an endothermic type gas, and containing 20 to 40 vol. % of heated steam; and forming a film of tri-iron tetroxide on a surface of the sintered mass and on wall portions of a plurality of pores formed within the sintered mass.

8 Claims, 3 Drawing Figures (a)

(b)

METHOD FOR MANUFACTURING A SLIDE MEMBER

This application is a continuation of application Ser. No. 393,651, filed June 30, 1982, now abandoned.

BACKGROUND OF THE INVENTION (1) Field of the Invention

The present invention relates to a method for manufacturing an anti-wear slide member having improved anti-pitting and initial stage fit of its slide surface. More specifically, it relates to a treating method for improving an initial stage fit of a slide member for use in an internal combustion engine under especially severe conditions in service and for ameliorating the pitting problem caused by the pores inherent in the sintered alloy. The slide member is manufactured by using the sintered alloy disclosed in U.S. Pat. No. 4,388,144.

(2) Prior Art

As a material for a slide member for use in an internal combustion engine, such as a cam shaft, subjected to sliding, especially under highly plane pressure, ordinary cast iron or a chilled casting of an alloyed cast iron have been employed. For the purpose of improvement in performance, reduction in weight and cost, and so forth, there have been proposed cam-cam shaft assemblies in which the cam piece is made of sintered alloy and the cam shaft is made of steel pipe or the like. Further, a rocker arm pad made of excellent anti-wear material is attached to the rocker arm where it is in contact with the cam piece.

U.S. Pat. No. 4,388,114 discloses a high-density and high-hardness anti-wear sintered alloy characterized by excellent durability for use as a slidable member subjected in service to a relatively high plane pressure, and a method for manufacturing the alloy. The sintered alloy disclosed in this U.S. patent has the advantages that it has extremely excellent anti-wear property and is very strong. These advantages ae at least partially due to the fact that the density of the compression molded mass is increased during sintering. U.S. Pat. No. 4,388,114 also discloses the production of cam shafts and rocker arm pads using such a sintered alloy.

However, since the slide member of this anti-wear sintered alloy has pores generated inherently in the sintered alloy, there remains the problem that pitting takes place on the slide surfaces of the parts after a prolonged sliding time during service under high plane pressure. Further, the parts made of this sintered alloy are inferior in initial stage fit under severe conditions.

SUMMARY OF THE INVENTION

An object of the present invention is, therefore, to provide a method for manufacturing a slide member which is free from defects encountered in the conventional slide members.

More specifically, the principal object of the present invention is to provide a method for manufacturing a slide member which is free from the defects encountered in the slide member made of the sintered alloy disclosed in U.S. Pat. No. 4,388,114.

The present invention provides a method for manufacturing a slide member with improved anti-pitting and initial stage fit properties by the formation of a thin film of tri-iron tetroxide on the surface of the sintered alloy and the circumferential walls of the inner pores.

BRIEF DESCRIPTION OF THE DRAWING

These and other objects and advantages of the present invention will become obvious upon an understanding of the illustrative embodiments as described or as indicated in the appended claims in conjunction with the attached drawing in which:

DETAILED DESCRIPTION OF THE PREFERRED EMBODIMENT

Figure 1:
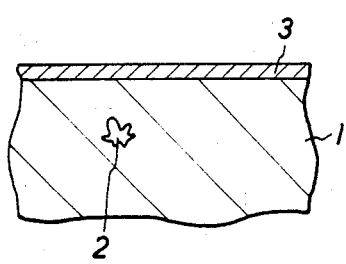
FIG. 1(a) is a schematic section view of a sintered product after ordinary steam treatment.
FIG 1(b) is a section view illustrating the state of a sintered alloy obtained according to the method of the present invention.
Figure 1:
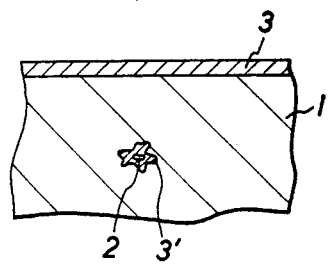

A sintered alloy used in the present invention, which is the same or similar to that disclosed in U.S. Pat. No. 4,388,114 has the following composition: Cr, from 2.5 to 7.5 wt.%, Mn, from 0.1 to 3.0 wt.%, P, from 0.2 to 0.8 wt.%; Cu, from 1.0 to 5.0 wt.%, Si, from 0.5 to 2.0 wt.%; Mo, from 0 to 3 wt.%; C, from 1.5 to 3.5 wt.%; and the balance being Fe with less than 2 wt.% of impurities.

According to the method of the present invention, the alloy powder having the above-mentioned composition is molded into a compression molded mass under a molding pressure from 5 to 7 ton/cm$^3$; sintering is carried out at 1020° C. to 1180° C. for a given period which depends upon the sintering temperature. The sintered mass thus obtained is then placed into an improved treating device, and the interior of the improved treating device is decompressed to 0.1 to 0.8 atmospheres. The sintered mass is then soaked at a temperature from 450° to 550° C. in a gas containing a non-oxidizing or an endothermic type gas as the main component and having 20 to 40% by volume of heated steam. The soaking continues for 0.5 to 3 hours to form a thin film of tri-iron tetroxide on the surface of the sintered mass and on the inner circumferential walls of the inner pores.

The reasons why the above-mentioned elements are indispensable in this alloy and in the limited ranges as pointed out above are as follows:

The elements contained in the sintered alloy of the present invention have the following effects.

A part of Cr is solid-solved in the matrix and strengthens the matrix by forming a martensite or a bainite in the cooling process following the sintering, while the balance of the Cr combines with carbon to form hardened carbide particles of M$_3$C type with (Fe.Cr)$_3$C as the main component, thereby enhancing the anti-wear, anti-scuffing and anti-seizure properties of the sintered alloy. The addition of insufficient Cr is undesirable, because it will result in insufficiency of carbide formed and segregation of a carbide-like network on the crystalline boundary, thereby coarsening the structure and vastly deteriorating its slidability. The addition of excessive Cr is equally undesirable, because it will result in excess of carbide after sintering, a change of crystal structure from M$_3$C type to M$_7$C$_3$ type and virtual disappearance of the phosphorus compound phase of steadite, thereby changing the slidability and even increasing the attack on a piece to be coupled. The optimum range of Cr is from 4.5 to 6.5%.

Manganese plays a highly significant role in the present invention with the following three effects. First, it is solid-solved in the matrix and strengthens the matrix;

further it remarkably improves the hardenability of the alloy.

Second, Mn activates the Fe matrix for sintering and therey enables sintering at lower temperatures with concomitant energy savings.

Third, Mn inhibits the crystal growth, refines the carbide and contributes to spheroidization, thereby improving the slidability. Meanwhile the effect of enhancing the strength of a presintered mass through preliminary sintering before the parts are worked or assembled is virtually non-existent at addition of less than 0.10%, but an addition exceeding 3.0% will spheroidize and harden the atomized alloy power, resulting not only in a large reduction in the compressibility and moldability of the powder by making it—impossible to obtain a desired density or hardness but also reducing sinterability through oxidation. Thus the addition of Mn is limited to 0.10–3.0%, preferably 0.10–1.5%.

Phosphorus contributes to the sintered alloy of the present invention in that it activates sintering by being solid-solved into the matrix during sintering, with the effect of not only enabling sintering at lower temperatures but also giving higher density through the liquid phase by forming a low melting-point steadite phase. Such effects of phosphorus will, however, be unsatisfactory when too little is added.

If too much phosphorus is added, the liquid phase will become excessive, resulting in abnormal growth of carbide and steadite and embrittlement of the crystalline boundary, which lowers the slidability. Thus the addition of phosphorus is limited to 0.2–0.8%, preferably 0.35–0.65%.

Molybdenum, like Cr, not only increases the hardness of the sintered mass by strengthening the matrix and enhancing the hardenability but also improves the slidability by forming a hardened compound carbide with $(Fe.Cr.Mo)_3C$ as the main component. Even without addition of Mo, the necessary performance of slidable parts such as the cam may be secured, but the addition of less than 3% by weight of Mo will be useful, because it has an effect of making the carbide more spheroidal and suppressing the aggressiveness of the alloy to the coupled piece. The addition is limited to less than 3%, preferably 0.5–1.5%, because the addition of more than 3% by weight of Mo would cause a network formation of carbide at the crystalline boundary, thereby embrittling the alloy, lowering the slidability and leading to higher costs.

Copper, being solid-solved in the matrix, stabilizes sintering, increases the strength and hardness of the matrix, refines the carbide and contributes to a spherodization of the carbide. When the addition of copper is too little, these effects will not emerge; when it is too much the crystalline boundary will be weakened, resulting not only in a lowered slidability but also in increased cost. Thus the addition of Cu is limited to 1.0–5.0%, preferably 1.5–3.0%.

Silicon, being solid-solved in the matrix, stabilizes sintering of the Fe matrix. Meanwhile silicon is necessary as an essential deoxidizer of the molten metal when it is atomized to make an alloy powder. The addition of too little Si, however, will accelerate the oxidization of the alloy powder, resulting in a loss of the deoxidizing effect, while the addition of too much Si will not only lower the hardenability of the matrix, resulting in a decline of the hardness, but also coarsen the carbide and cause its segregation on the crystalline boundary, resulting in a lower slidability. Thus the addition is limited to 0.5–2%, preferably 0.7–1.5%.

Graphite, used as carbon, being solid-solved in the matrix, increases the hardness and strengthens the matrix; moreover, it improves the wear resistance by forming, together with chrome and molybdenum, such carbide compounds as $(Fe.Cr)_3C$ or $(Fe.Cr.Mo)_3C$ and contributing to the formation of steadite phase (Fe-$Fe_3C$-$Fe_3P$).

The addition of too little graphite, however, will cause an insufficient hardness of the matrix and in the volumes of carbide and steadite, while the addition of excessive graphite will cause a coarsening of the structure and a network growth at the crystalline boundary, thereby substantially deteriorating the slidability and heavily attacking the coupled piece. Thus the addition is limited to 1.5–3.5%, preferably 1.8–3.0%.

The sintered alloy used in the present invention can be obtained by preparing an alloy powder composed of the elements except carbon; adding a specified amount of carbon to this powder to make a molded power (compressed powder); and the sintering in a mold.

The alloy powder, which is the material of the sintered alloy used in the present invention, is obtainable by various routine processes, but usually it is obtained from a molten metal by the atomizing method.

According to the atomizing method, the molten alloy materials are prepared by mixing the powders of the alloy materials together and then atomizing from the upper side to produce a atomized metal while the jet water stream is blown against the dropping molten metal from a side in a $N_2$ atomosphere. The alloy powder with a given carbon content is then molded into a desired shape. The molding is done under a molding pressure of 5 to 7 ton/cm$^2$. The density of the molded product is preferably from 5.8 to 6.4 g/cm$^3$. If the density is less than 5.8 g/cm$^3$, the sintered product subsequently obtained has poor strength due to low density, while if the density exceeds 6.4 g/cm$^3$, it will cause undesirable abrasion of the mold.

Next, the compression-molded powder is sintered at a temperature in the range of 1020° to 1180° C. in a reducing atmosphere, vacuum or the like, for a specified period. The sintering time depends on the temperature at which sintering is carried out.

Thereafter, the sintered product is placed into an improved treating device, and the interior of the improvement treating device is decompressed to 0.1 to 0.8 atmospheres, preferably 0.2 to 0.8 atmospheres. The sintered mass is then soaked in a soaking gas at a temperature from 450° to 550° C., prefeably 480° to 520° C. The soaking gas contains 20 to 40% by volume by heated steam, preferably from 25 to 35% by volume by heated steam. The soaking gas contains a non-oxidizing type gas or an endothermic type gas as the main component. The soaking gas is introduced into the interior of the treating device while the interior of the device is being kept at a pressure of 0.1 to 0.8 atmospheres, preferably 0.2 to 0.8 atmospheres. During the soaking step, the sintered product is kept at a temperature of between 450° and 550° C., preferably between 480° and 520° C. The soaking step lasts from 0.3 to 5 hours, preferably from 1.5 to 2.5 hours, and it causes a thin film of tri-iron tetroxide to form on the surface of the sintered product and on the surfaces of the pores located inside the sintered product.

The improved treating equipment is not limited to a specific profile or any material as long as it can house the sintered material inside of it and enable the reduction in pressure of the interior and further withstand the soaking carried out at the temperature range of 450° to 550° C.

The reduction in the pressure in the treating equipment to approximately 0.1 to 0.8 atm., facilitates the invasion of the introduced gas into the sintered product. If the pressure exceeds 0.8 atm., the effect for the steam-containing gas to invade the sintered products does not occur, while if the pressure is less than 0.1 atm. the equipment must be stronger, thereby undesirably resulting in higher costs.

Further, it is necessary to soak the improved type treating equipment at a temperature in the range of 450° to 550° C. If the temperature exceeds 550° C., the temperature distribution in the equipment is disturbed and a film of ferric oxide is apt to be formed on the portion of the sintered product where the formation of the film of tri-iron tetroxide is intended. The temperature being less than 450° C. is also undesirable because the treating times becomes longer.

Non-oxidizing type gas may include an inert gas such as $N_2$, Ar or the like, and the endothermic type gas may include a mixed gas of $CH_4 + N_2 + H_2 + CO$, or the like.

The content of the steam in the gas to be introduced into the improved treating equipment is from 20 to 40 vol.%. If the steam content of the gas is less than 20%, an excessive time is required for the formation of a film of the intended iron oxide, while if the steam content of the gas exceeds 40%, dew drops are undesirably formed on the surface of the sintered product.

In the case where the surface of the sintered product is subjected to an ordinary steam treatment (100% steam), as shown in FIG. 1(a), a film of tri-iron tetroxide 3 is formed on the surface of the sintered product 1 and thereby initial stage fit is improved. However, the steam will not invade the sintered product 1 to the surfaces (walls) of the pores 2 produced inside the sintered product 1, and consequently scuffing is likely to develop, originating from such pores. Meanwhile, according to the present invention, besides the film 3 of tri-iron tetroxide formed on the surface of the sintered product 1, a the film 3' of tri-iron oxide is formed on the inner surfaces of the pores 2 inside of the sintered product 1. Therefore, the ratio of the space the pores occupy in the sintered product 1 decreases and further, the surfaces of the pores 2 is strengthened by the film 3'. Accordingly, notch brittleness is suppressed and antipitting property is enhanced. As a matter of course, the initial stage fit under unlubricated conditions is improved.

The present invention will be now described in detail with reference to Examples and Controls. The Examples are merely illustrative of the present invention and are not intended to limit the scope of the present invention.

EXAMPLE 1

−100 mesh (−350 mesh portion being less than 40%) of atomized alloy powder comprising 2.5% of Cr, 0.10% of Mn, 5.0% of Cu, 0.5% of Si, 0.7% of P, and the balance being Fe with less than 2% of impurities was prepared. Next, 1.6% of scaly graphite was added to the powder, and further, 0.5% of zinc stearate was added based on the total weight of the mixture. Then, the mixing was done by a V-type powder mixer for 30 min. The mixed powder thus obtained was molded into a compressed powder mass in the form of cam piece (molded density 6.1 g/cm$^3$) under a molding pressure of 6 ton/cm$^2$, then sintered at 1150° C. under a dew point of −20° C. in a decomposed ammonia gas for 60 min. and then cooled at a cooling rate of about 10° C./min. Thereafter, it was taken out as a sintered alloy cam piece. The content of carbon was found to be 1.5% after sintering.

A cam-cam shaft assembly, in which the cam piece thus produced was assembled onto a cam shaft body of steel pipe, was placed in the improved treating equipment and soaked at 500° C. While the pressure was kept at 0.2 atm., an endothermic type gas, containing 35 vol.% of superheated steam, was introduced into the inside of the equipment. The sintered product was kept in this state at 500° C. for 2 hours to carry out the treatment according to the present invention.

EXAMPLE 2

−100 mesh (−350 mesh portion being less than 40%) of atomized alloy powder comprising 2.5% of Cr, 0.10% of Mn, 5.0% of Cu, 0.5% of Si, 0.7% of P and the balance being Fe with less than 2% of impurities was prepared. To it were added 1.6% of scaly graphite, and further, 0.5% of zinc stearate based on the total weight of the mixed powder. The mixing was carried out in a V-type powder mixer for 30 min. After molding the mixing powder into a compressed powder mass in a form of cam piece molded density 6.1 g/cm$^3$), the compressed powder mass was sintered at 1150° C. in decomposed ammonia gas under a dew point of −20° C. for 60 min. and cooled at a cooling rate of 10° C./min. It was taken out as a sintered alloy cam piece. It was found that the content of carbon in the alloy after sintering decreased to 1.5%.

A cam-cam shaft assembly, in which the cam piece thus produced was assembled onto a cam shaft body of steel pipe, was placed in the improved treating equipment and soaked at 500° C. While the pressure was kept at 600 mm Hg, $N_2$ gas containing 25 vol.% of superheated steam was introduced into the treating equipment. The product was kept in the equipment at 500° C. for 2 hours to effect the treatment according to the present invention.

EXAMPLE 3

−100 mesh of atomized alloy powder comprising 5.0% of Cr, 1.0% of Mn, 2.0% of Cu, 1.0% of Si, 0.5% of P, and the balance being Fe with less than 2% of impurities was prepared, Next, 2.7% of scaly graphite was added to the alloy powder. Similar to the procedures of Example 1, a compressed powder mass in the form of cam piece was obtained and sintered at 1120° C. to produce a sintered alloy cam piece. It was found that the content of carbon in the alloy decreased to 2.5% after sintering.

A cam-cam shaft assembly, in which the cam piece thus produced was assembled onto a cam shaft body of steel pipe, was placed in the improved treating equipment and soaked at 500° C. While the pressure was kept at 0.2 atm., an endothermic type gas containing 35 vol.% of super heated steam was introduced into the equipment and, the assembly was kept for 2 hours in this state to carry out the treatment according to the present invention.

EXAMPLE 4

−100 mesh of atomized alloy powder comprising 5.0% of Cr, 1.0% of Mn, 2.0% of Cu, 1.0% of Si, 0.5% of P, and the balance being Fe with less than 2% of impurities was prepared. Next, 2.7% of scaly graphite was added to this alloy powder. Subsequently, similarly to the procedures of Example 1, a compression powder mass in the form of a cam piece was obtained and sintered at 1120° C. to produce a sintered alloy cam piece. It was found that the content of carbon in the alloy decreased to 2.5% after sintering.

A cam-cam shaft assembly, in which the cam piece thus produced was assembled onto a cam shaft body of steel pipe, was placed in the improved treating equipment and soaked at 500° C. While the pressure was kept at approximately about 600 Mm Hg, $N_2$ gas containing 25 vol.% of superheated steam was introduced into the inside of the equipment, and the assembly was kept at 500° C. for 2 hours to effect the treatment according to the present invention.

EXAMPLE 5

−100 mesh of atomized alloy powder comprising 7.5% of Cr, 3.0% of Mn, 1.0% of Cu, 2.0% of Si, 0.2% of P, and the balance being Fe with less than 2% of impurities was prepared. Next, 3.8% of scaly graphite was added to this alloy powder. Subsequently, similarly to the procedures of Example 1, a compressed powder mass in the form of cam piece was obtained and sintered at 1100° C. to produce a sintered alloy cam piece. It was found that the content of carbon decreased to 3.5% after sintering.

A cam-cam shaft assembly, in which the cam piece thus obtained was assembled onto a cam shaft body of steel pipe, was placed into the improved treating equipment. While the pressure was kept at 0.2 atm., an endothermic type gas containing 35 vol.% of superheated steam was introduced into the inside of the equipment, and the assembly was kept at 500° C. for 2 hours to carry out the present invention.

EXAMPLE 6

−100 mesh of atomized alloy powder comprising 7.5% of Cr, 3.0% of Mn, 1.0% of Cu, 2.0% of Si, 0.2% of P, and the balance being Fe with less than 2% of impurities was prepared. Next, 3.8% of scaly graphite was added to this alloy powder. Subsequently, similarly to the procedures a Example 1, a compressed powder mass in the form of cam piece was obtained and sintered at 1100° C. to produce a sintered alloy cam piece. It was found that the content of carbon in the alloy decreased to 3.5% after sintering.

A cam-cam shaft assembly, in which the cam piece thus produced was assembled onto a cam shaft body of steel pipe, was placed in the improved treating equipment. While the pressure was kept at 600 mm Hg, $N_2$ gas containing 25 vol.% of superheated steam was introduced into the inside of the equipment, and the assembly was kept inside of the equipment at 500° C. for 2 hours to carry out the treatment according to the present invention.

EXAMPLE 7

An atomized alloy powder was prepared by using an alloy material containing 3% of Mo of the composition in Example 2. Similarly to the procedures of Example 2, a sintered alloy cam piece was obtained by using this atomized alloy powder.

A cam-cam shaft assembly, in which the cam thus produced was assembled onto the cam shaft assembly of steel pipe, was placed in the improved treating equipment and soaked at 500° C. While the pressure was kept at 600 mm Hg, an endothermic type gas containing 35 vol.% of superheated steam was introduced into the equipment and the assembly was kept for 2 hours at 500° C. to carry out the treatment according to the present invention.

EXAMPLE 8

An atomized alloy powder was prepared by using an alloy containing 3% Mo of the composition in Example 2. A sintered alloy cam piece was produced similar to the procedure of Example 2.

A cam-cam shaft assembly, in which the cam piece thus produced was assembled onto a cam shaft, was placed in the improved treating equipment and soaked at 500° C. While the pressure was kept at approximately 600 mm Hg, $N_2$ gas containing 25 vol.% of superheated steam was introduced into the equipment, and the assembly was kept in this state for 2 hours at 500° C.

CONTROL 1

−100 mesh (−325 mesh portion being less than 40%) of atomized alloy powder comprising 2.5% of Cr, 0.10% of Mn, 5.0% of Cu, 0.5% is Si, 0.7% of P, and the balance being Fe with less than 2% of impurities was prepared. Next, 1.6% of scaly graphite was added to this atomized alloy powder, and further, 0.5% of zinc stearate was added to it based on the total weight of the mixture. Then, the mixing was carried out in a V-type powder mixer for 30 min. After molding the mixed powder thus obtained into a compressed powder mass in the form of a cam (molded density 6.1 g/cm$^3$) under a molding pressure of 6 ton/cm$^2$, it was sintered at 1150° C. in decomposed ammonia gas under a dew point of −20° C. for 60 min. and cooled at a cooling rate of 10° C./min. The product was taken out as a sintered alloy cam piece. It was found that the content of carbon decreased to 1.5% after sintering.

CONTROL 2

−100 mesh of atomized alloy powder comprising 5.0% of Cr, 1.0% of Mn, 2.0% of Cu, 1.0% of Si, 0.5% of P, and the balance being Fe with less than 2% of impurities was prepared. Next, 2.7% of scaly graphite was added to this atomized alloy powder. Subsequently, similar to the procedures of Example 1, a compressed powder mass in the form of a cam piece was obtained by molding and sintered at 1120° C. to produce a sintered alloy cam piece. It was found that the content of carbon decreased to 2.5% after sintering.

CONTROL 3

−100 mesh of atomized alloy powder comprising 7.5% of Cr, 3.0% of Mn, 1.0% of Cu, 2.0% of Si, 0.2% of P, and the balance being Fe with less than 2% of impurities was prepared. Next, 3.8% of scaly graphite was added to this powder. Subsequently, similar to the procedures of Example 1, a compressed powder mass in the form of a cam piece was produced and sintered at 1100° C. to produce a sintered cam piece. It was found that the content of carbon decreased to 3.5% after sintering.

CONTROL 4

A atomized alloy powder was prepared by using an alloy containing 3% of Mo in the composition of Example 2. A cam piece was produced from this atomized powder following the sintering procedures of Example 2.

CONTROL 5

−100 mesh (−350 mesh portion being less than 40%) of atomized alloy powder comprising 2.5% of Cr, 0.10% of Mn, 5.0% of Cu, 0.5% of Si, 0.7% of P, and the balance being Fe with less than 2% of impurities. Next, 1.6% of scaly graphite was added to this powder, and further, 0.5% of zinc-stearate was added to it based on the total weight of the mixture. The mixing was carried out in a V-type powder mixer for 30 min. After molding the mixed powder into a compressed powder mass in the form of a cam piece (molded density 6.1 g/cm$^3$) under a molding pressure of 6 ton/cm$^2$, it was sintered at 1150° C. in decomposed ammonia gas under a dew point of −20° C. for 60 min. and cooled at a cooling rate of 10° C./min. It was taken out as a cam piece. It was found that the content of carbon was 1.5% after sintering.

A cam-cam shaft assembly, in which the cam piece thus produced was assembled onto a cam shaft of steel pipe, was subjected to an ordinary steam treatment (550° C. for 2 hours in steam).

CONTROL 6

−100 mesh of atomized alloy powder comprising 5.0% of Cr., 1.0% of Mn, 2.0% of Cu, 1.0% of Si, 0.5% of P, and the balance being Fe with less than 2% of impurities was prepared. Next, 2.7% of scaly graphite was added to this powder. Subsequently, similar to the procedures of Example 1, a compressed powder mass was formed by molding and then sintering at 1120° C. to produce a sintered alloy cam piece. It was found that the content of carbon decreased to 2.5% after sintering.

A cam-cam shaft assembly, in which the cam thus produced was assembled to a cam shaft body of steel pipe, was subjected to an ordinary steam treatment (550° C. for 2 hours in steam).

CONTROL 7

−100 mesh of atomized alloy powder comprising 7.5% of Cr, 3.0% of Mn, 1.0% of Cu, 2.0% of Si, 0.2% of P and the balance being Fe with less than 2% of impurities was prepared. To this powder was added 3.8% of scaly graphite. Subsequently, a compressed powder mass in the form of a cam piece was produced following the procedures in Example 1 and was then sintered at 1100° C. to produce a sintered alloy cam piece. It was found that the content of carbon was 3.5% after sintering.

A cam-cam shaft assembly, in which the cam piece thus produced was assembled onto a cam shaft of steel pipe, was subjected to an ordinary steam steam treatment (550° C. for 2 hours in steam).

CONTROL 8

An atomized alloy powder was prepared by using an alloy containing 3% of Mo in the composition of Example 2. Subsequently, similar to the procedures of Example 2, a cam piece was produced by using this alloy powder.

A cam-cam shaft assembly, in which the cam piece thus obtained was assembled onto a cam shaft body of steel pipe, was subjected to a ordinary steam treatment (550° C. for 2 hours in steam).

CONTROL 9

A cam piece was produced by chilling cast iron having a composition of 3.2% of C, 2.1% of Si, 0.7% of Mn, 0.5% of Cr, 0.2% of Mo, and the balance being Fe with a slight amount of impurities, which is an ordinary chilled alloy cast iron material, to provide a control.

TEST EXAMPLE

An abrasion test under no lubrication and a pitting evaluation test were carried out such that each of the cam-cam shaft assemblies obtained in the above Examples and Controls was coupled to an opponent rocker arm made of cemented-hardened steel JIS SCr 30 steel with a Cr-plated surface.

Figure 2:
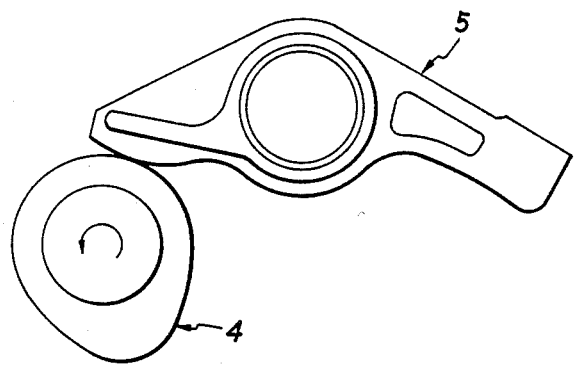
FIG. 2 is a view illustrating a test method as to wearing and pitting properties.

As shown in FIG. 2, the non-lubricant abrasion test was carried out by a firing at approximately 3000 to 4000 rpm for 10 hours with a cam piece 4 which was in continuous contact with a rocker arm 5.

The pitting evaluation test was carried out similar to the non-lubricant abrasion test. As shown in FIG. 2, the pitting evaluation test was conducted such that the cam piece 4 and the rocker arm 5 were in continuous contact with each other while a low viscosity oil was applied to them, and a valve spring load, which is ordinarily set at 60 kg/mm$^2$, was set at 120 kg/mm$^2$ in a durability test conducted at 2000 rpm for 2000 hours. The results are shown in Table 1.

TABLE 1

| Example | Non-lubricant abrasion test | | Pitting evaluation | |
|---|---|---|---|---|
| | Cam abrasion amount | Rocker arm abrasion amount | Cam evaluation | Evaluation from rocker arm |
| Example | | | | |
| 1 | 125 | 43 | 10 | 10 |
| 2 | 119 | 46 | 10 | 9.5 |
| 3 | 91 | 29 | 9.5 | 10 |
| 4 | 89 | 32 | 10 | 10 |
| 5 | 64 | 22 | 10 | 10 |
| 6 | 67 | 20 | 9.5 | 9.5 |
| 7 | 53 | 16 | 10 | 10 |
| 8 | 51 | 17 | 9.5 | 10 |
| control | | | | |
| 1 | 854 | 152 | 7 | 8 |
| 2 | 748 | 134 | 7.5 | 7 |
| 3 | 519 | 107 | 7 | 7.5 |
| 4 | 432 | 94 | 8 | 7 |
| 5 | 124 | 43 | 7.5 | 7.5 |
| 6 | 145 | 37 | 8 | 8 |
| 7 | 103 | 39 | 8 | 7.5 |
| 8 | 112 | 41 | 7.5 | 8 |
| 9 | 245 | 76 | 8.5 | 8.5 |

Note:
Full mark is set at 10.

As apparent from the foregoing, the cam-cam shaft assembly obtained according to the method of the present invention exhibits an excellent initial stage fit due to the formation of the film of tri-iron tetroxide on the slide surface of the cam piece as sintered, and as shown in Table 1, it exhibits excellent anti-wear properties in the non-lubricant abrasion test.

Further, since the film of tri-iron tetroxide is also formed onto the wall surfaces of the pores produced inside of the cam piece as sintered, the walls of the pores are strengthened and consequently the anti-pitting property is improved compared with the ordinary sintered product.

In the foregoing, the treating method according to the present invention has been described in connection with the cam-cam shaft assembly, but it will easily understood that a number of variations and modifications can be attained with no difficulty without departing from the scope of the present invention.

What is claimed is:

1. A method of manufacturing a slide member, said method comprising the steps of:
   (a) mixing an alloy powder comprising by weight from 2.5% to 7.5% Cr, from 0.1% to 3.0% Mn, from 0.2% to 0.8% P, from 1.0% to 5.0% Cu, from 0.5% to 2.0% Si, from 0.0% to 3% Mo, from 1.5% to 3.5% C, and the balance Fe having less than 2% impurities; then
   (b) compressing said alloy powder at a molding product pressure of 5 to 7 tons/cm$^2$ to form a compressed powder mass; then
   (c) sintering said compressed powder mass at a temperature of between 1020° C. and 1180° C. to produce a sintered alloy mass having a surface thereon and a plurality of internal pores therein; then
   (d) subjecting said sintered alloy mass to a pressure of between 0.1 atmospheres and 0.8 atmospheres for from 1.5 to 2.5 hours, thereby facilitating the entry of a soaking gas into said plurality of internal pores in the next step; and then
   (e) exposing said sintered alloy mass to a soaking gas containing 20% to 40% by volume of steam and 60% to 80% by volume of a gas selected from the group consisting of non-oxidizing gas, an endothermic gas, or a mixture thereof for between 0.5 hours and 5 hours at a temperature of between 450° C. and 550° C. and at a pressure of between 0.1 and 0.8 atmospheres, thereby forming a film of tri-iron tetroxide on the surface of said sintered alloy mass and on the walls of said plurality of internal pores in said sintered alloy mass.

2. A method as recited in claim 1 wherein said non-oxidizer gas is a gas selected from the group consisting of $N_2$ and Ar.

3. A method as recited in claim 1 wherein said endothermic gas is a mixture of $CH_4$, $N_2$, and CO.

4. A method as recited in claim 1 wherein the temperature in step (e) is between 480° C. and 520° C.

5. A method as recited in claim 1 wherein said soaking gas contains between 25% and 35% steam by volume.

6. A method as recited in claim 1 wherein the pressure in step (d) is between 0.2 atmospheres and 0.8 atmospheres.

7. A method as recited in claim 1 wherein the pressure in step (e) is between 0.2 atmospheres and 0.8 atmospheres.

8. A method as recited in claim 1 wherein the weight composition of the alloy powder recited in step (a) is 4.5% to 6.5% Cr, 0.1% to 1.5% Mn, 0.35% to 0.65% P, 1.5% to 3.0% Cu, 0.7 to 1.5% Si, 0.5% to 1.5% Mo, 1.8% to 3.0% C, and the balance Fe having less than the 2% impurities.

* * * * *